(No Model.)
W. H. &. C. A. HOLCOMBE.
MACHINE FOR TRANSMITTING ROTARY MOTION.
No. 265,260.  Patented Oct. 3, 1882.
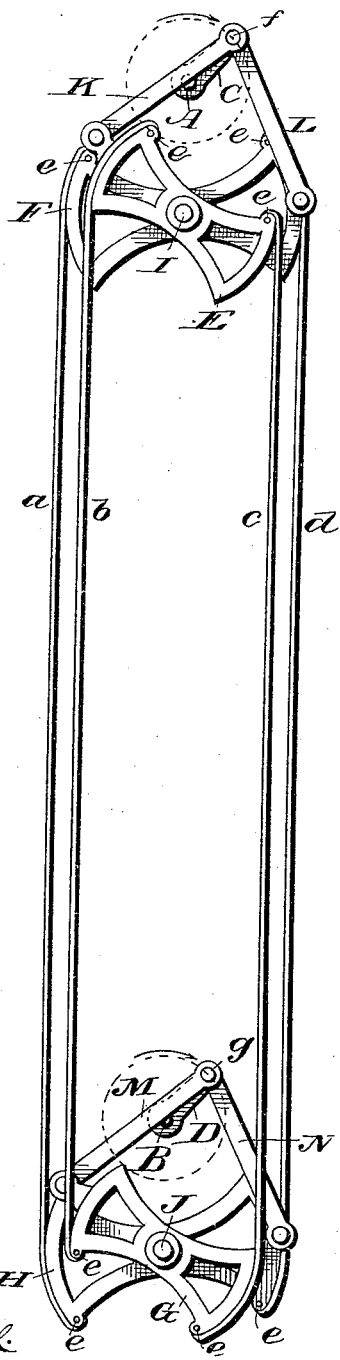
Witnesses:
Jas. F. DuHamel.
Walter S. Dodge.
Inventors.
William H. Holcombe,
Clifford A. Holcombe,
by Dodge & Son,
Attys.

UNITED STATES PATENT OFFICE.

WILLIAM H. HOLCOMBE AND CLIFFORD A. HOLCOMBE, OF BELOIT, WIS.

MACHINE FOR TRANSMITTING ROTARY MOTION.

SPECIFICATION forming part of Letters Patent No. 265,260, dated October 3, 1882.

Application filed April 13, 1882. (No model.)

*To all whom it may concern:*

Be it known that we, WILLIAM H. HOLCOMBE and CLIFFORD A. HOLCOMBE, citizens of the United States, residing at Beloit, county of Rock, and State of Wisconsin, have invented new and useful Improvements in Machines for Transmitting Rotary Motion, of which the following is a specification.

Our invention relates to improvements in machinery for transmitting rotary motion, in which three or more connecting rods, belts, or chains are required to transmit the rotary motion, and said rods, belts, or chains are operated by a single crank and wrist-pin at each shaft; and the object of our invention is to transmit rotary motion from one shaft to the other by the use of reciprocating connecting rods, chains, or belts by tensile strain only; also, to operate the chains, rods, or belts for transmitting rotary motion by only one crank and wrist-pin in connection with each revolving shaft.

We accomplish the desired objects by the mechanism illustrated in the accompanying drawing, which is a face view of the machine.

A and B represent the revolving shafts—A the driving-shaft, and B the shaft to which the rotary motion is to be transmitted; but either shaft may be used as the driving-shaft. To A and B the cranks C and D are securely fastened. The rocking sheaves E F G H are supported by stationary center bolts, I and J, and are connected by the reciprocating rods, belts, or chains *a b c d*, which are fastened at points *e* by suitable hooks or bolts. The driving-shaft A is connected with the rocking sheaves E F by the crank C, wrist-pin *f*, and pitmen K L, and in a similar manner the shaft B is connected by crank D, wrist-pin *g*, and pitmen M N with the rocking sheaves G H. When the shaft A is made to revolve in the direction indicated by the arrow the motion imparted to the pitmen K L causes the sheaves E F to rock on the pin I, and the reciprocating motion is transmitted to the sheaves G H through the connecting rods, belts, or chains *a b c d* by the tensile strain of each successively, and not by any thrust or pushing. The rocking or reciprocating motion of the sheaves G H operates the pitmen M N, and through the wrist-pin *g* and crank D revolves the shaft B in the same direction that the driving-shaft A is revolving.

Heretofore rotary motion has been transmitted with belts or chains by running them continuously in one direction, or when the rods or pitmen have been used for such purpose the motion has been transmitted by alternate push and pull of such rods or pitmen, and if the distance between the shafts or the power to be transmitted is great, necessitating crossheads or stays and guides at short intervals to prevent doubling up or springing of the rods when they are pushing, thereby greatly increasing friction, size of rods, and cost of construction.

With our machine, which only uses the pull or tensile strain of the rods, rotary motion can be transmitted a long distance with comparatively-small rods, belts, or chains, and without such guides, thereby reducing the weight, cost, and friction to the minimum.

We do not claim as our invention mechanism for transmitting motion by means of belts and chains that run continuously in one direction, nor by reciprocating rods or pitmen by which the motion is transmitted by alternate push and pull of the rods and pitmen.

Having thus described our invention, what we claim is—

1. In a device for transmitting rotary motion from one shaft to another, the combination of two or more reciprocating connecting rods, belts, or chains with a single wrist-pin and crank on each shaft, the rods, belts, or chains being connected with said wrist-pins, substantially in the manner shown and described.

2. In a device for transmitting rotary motion, the combination of the shafts A B, cranks C D, rocking sheaves E F and G H, reciprocating rods *a b c d*, and pitmen K L M N, constructed and arranged substantially as shown and described.

WILLIAM H. HOLCOMBE.
CLIFFORD A. HOLCOMBE.

Witnesses:
J. B. DOW,
O. B. OLMSTED.